March 9, 1943.  F. G. MANLY  2,313,564
FLUID CONTROL VALVE
Filed Jan. 16, 1941　　2 Sheets-Sheet 1
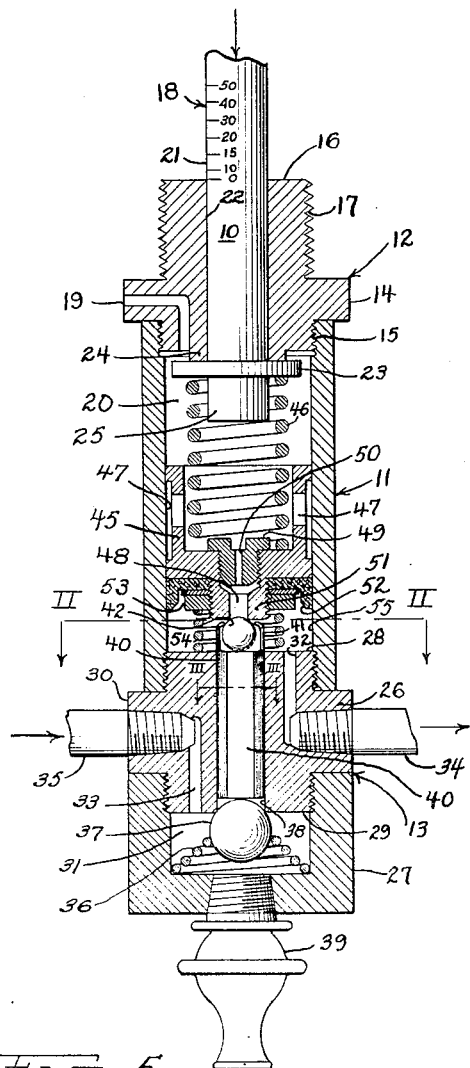
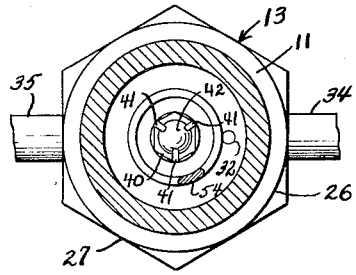
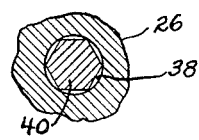
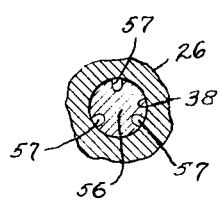
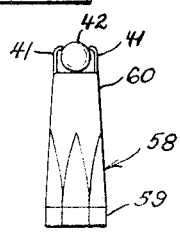
Inventor
Fred G. Manly
by Charles H. Hill Attys

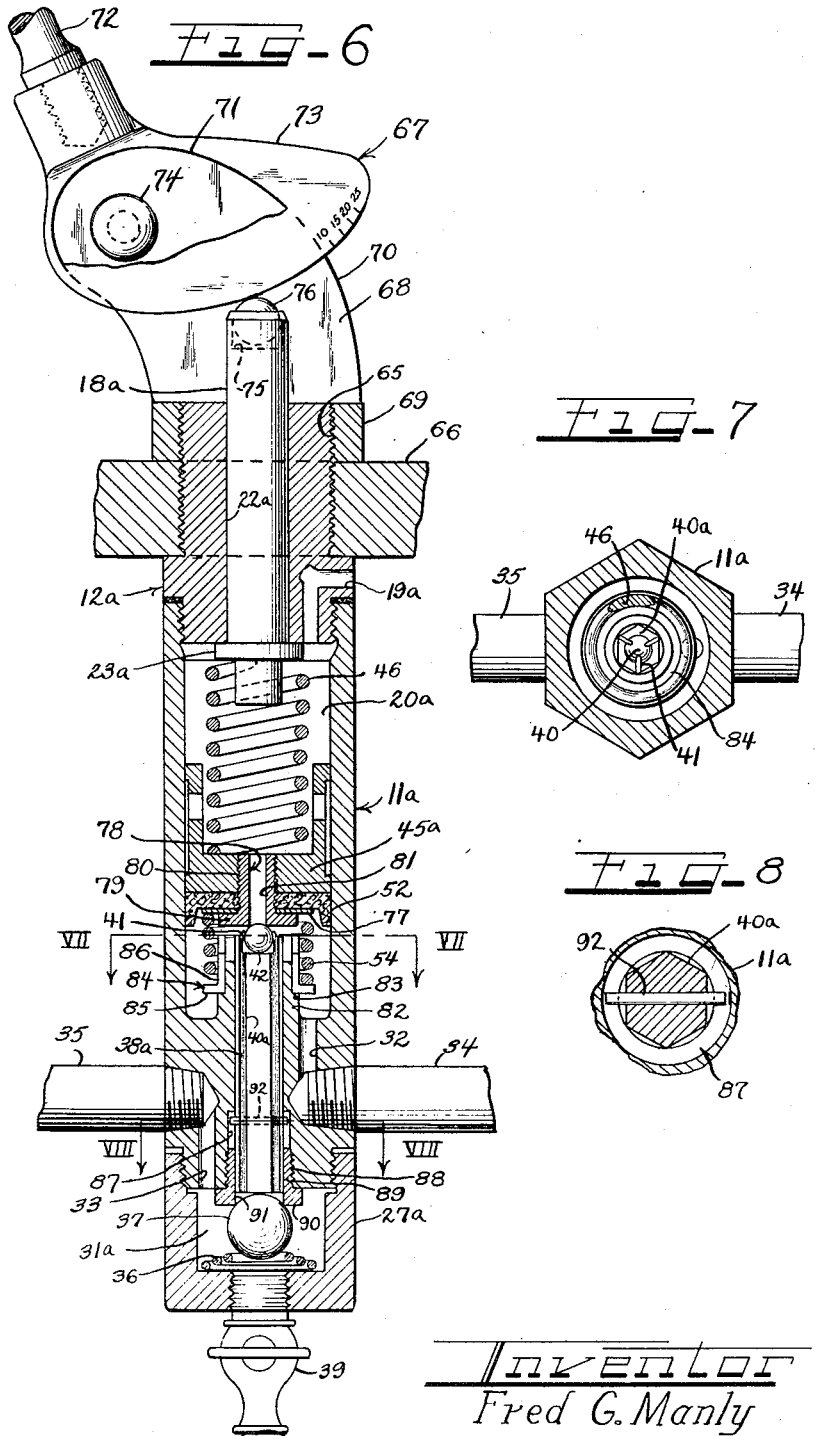

Patented Mar. 9, 1943

2,313,564

UNITED STATES PATENT OFFICE 2,313,564

FLUID CONTROL VALVE

Fred G. Manly, Chicago, Ill.

Application January 16, 1941, Serial No. 374,607

1 Claim. (Cl. 50—23)

The present invention relates to a novel fluid valve, and more particularly to a fluid valve which is capable of maintaining a differential pressure at its outlet of any constant value up to the pressure available at its inlet.

In the regulation of many mechanical devices, it is very necessary that variable fluid pressures be provided. At the same time, it is also necessary that these fluid pressures be capable of being maintained at any desired constant value, particularly where the fluid is used intermittently causing a drop in outlet pressure. It is equally important that the means for regulating such fluid pressures be capable of instant adjustment with the adjustment maintained in said position.

With the foregoing in mind, it is an important object of the present invention to provide a mechanical means by which fluid pressures are capable of being maintained in any constant differential relation with a fluid pressure source.

Another object of this invention is the provision of a valve mechanism capable of being adjusted to maintain any desired constant differential relation between its inlet and its outlet up to the maximum pressure available at its inlet.

A further object of the invention is to provide a valve mechanism capable of maintaining a predetermined constant outlet pressure independent of any variations in the inlet pressure above the predetermined outlet pressure.

Another and still further object of this invention is the provision of a self-aligning sliding valve in a valve mechanism which is capable of maintaining a constant predetermined outlet pressure.

It is also an object of the invention to provide a simple, durable, and inexpensive but efficient valve capable of maintaining any desired constant fluid pressure at its outlet.

The novel features believed to be characteristic of the present invention are set forth with particularity in the appended claim. The invention itself, however, both as to its organization and manner of construction, together with further objects and advantages thereof, may best be understood by reference to the following description taken in connection with the accompanying drawings, in which:

Figure 1 is a vertical cross-sectional view, with parts in elevation, of a valve mechanism embodying the principles of this invention;

Figure 2 is a transverse cross-sectional view, with parts in elevation, taken substantially along the plane indicated by the line II—II of Figure 1, and illustrating the shape and arrangement of parts when looking down on the upper check valve;

Figure 3 is an enlarged fragmentary transverse cross-sectional view taken substantially along the plane indicated by the line III—III of Figure 1 and illustrating the cross-sectional shape and arrangement between the sliding valve and its stationary guide;

Figure 4 is a view similar to Figure 3, illustrating a modified form of sliding valve;

Figure 5 is a side view in elevation of a modified form of sliding valve, similar to the sliding valve illustrated in Figure 3, and which embodies self-aligning characteristics;

Figure 6 is a view similar to Figure 1, illustrating a modified form of a valve mechanism;

Figure 7 is a view similar to Figure 2 taken substantially along the plane indicated by the line VII—VII of Figure 6; and, Figure 8 is a view similar to Figure 3 taken substantially along the plane indicated by the line VIII—VIII of Figure 6.

As illustrated in Figure 1, the valve mechanism 10 of the present invention is shown as comprising a tubular body or housing 11 having an upper end cap 12 and a lower end cap assembly 13. The upper end cap 12 is provided with a flange portion 14 arranged to seat against the end of the valve housing 11 when threaded thereinto, as at 15. The outer projecting portion 16 is threaded as at 17 for the purpose of connecting the valve to a stationary support or for carrying thereon means for depressing the cross-shaped plunger 18 slidably carried therein. A vent opening 19 is provided at one side of the upper end cap 12 to vent to the atmosphere any pressure exerting fluid retained within the chamber or cylinder 20 formed immediately below the upper end cap.

The cross-shaped plunger 18 has a rod-like body 21 which is slidingly received within a centrally located aperture 22 extending lengthwise of the end cap 12. Adjacent its lower end, the plunger 18 is provided with a flange 23 arranged to normally seat against the lower projecting portion 24 of the upper end cap in such a manner that the vent 19 is always open to the atmosphere. The plunger 18 is also provided at its lower end with a guide portion 25 for a purpose to be explained more fully hereinafter.

The lower end cap assembly 13 consists of a round cross-coupling 26 and an end cap 27 of hexagonal shape in cross-section for ease in gripping during assembly or disassembly (Figure 2). The cross-coupling 26 has an upper end 28 and a lower end 29 threaded for coupling or connecting together the tubular housing 11 and the end cap 27, both of which abut against the outwardly extending flange 30. The arrangement is such that a chamber 31 is formed between the end wall of the cap 27 and the lower end 29 of the cross-coupling 26. The cross-coupling 26 is also provided with oppositely positioned and extending longitudinal openings 32 and 33 which extend partially along the length of the coupling. At their terminals, the openings 32 and 33 connect with laterally extending openings provided in the flange 30 which are threaded to receive therein the threaded ends of pipes 34 and 35, the former constituting the outlet side of the valve and the latter constituting the inlet side thereof.

A spiral coil spring 36 is positioned within the chamber 31 to rest against the end wall of the cap 27. A hardened steel spherical ball 37 is seated on the upper or narrow end of the coil spring to normally seat against a central opening 38 provided longitudinally of the coupling 26 and having a diameter smaller than the ball 37. When so positioned, the ball 37 acts as a check valve. At the bottom of the end cap 27, there is provided a suitable aperture into which is threaded a pet cock 39 arranged to be opened for draining dirt and moisture collected in the chamber 31.

An endwise movable valve member 40 having a hexagonal cross-section, as shown in Figure 3, is inserted within the central opening 38 provided in the coupling 26 and normally rests at one end on the spherical ball 37 with its upper end normally supporting, for limited movement by fingers or prongs 41, an upper hardened steel spherical ball 42. The fingers 41 are arranged partially around the ball 42 to hold it for limited movement in any direction. It is preferred that the valve member 40 be of hexagonal shape, not only because its cross-sectional area is less than the opening 38 thereby providing fluid passageways therebetween, but because the valve may be so provided from rods of hexagonal stock thereby eliminating the necessity of machining.

A piston 45 is seated within the tubular valve body 11 and is arranged for limited vertical movement therein. The piston 45 is generally Y-shaped in cross-section, its central portion seatingly receiving one end of a compression coil spring 46 with the other end of the spring abutting the flange 23 of the plunger 18 and being held in position by the guide portion 25 thereof. Pressure relief openings 47 are provided in the side walls of the piston 45 to insure ease of endwise piston movement and proper seating thereon within the valve body. The openings 47 also serve as a holding means for receiving a rod therethrough so that the piston may be held for assembly without crushing its thin side walls which might collapse if gripped by hand.

A central aperture or port 48 is provided in the piston 45, one end of which forms a seat for the upper spherical ball 42. When the ball 42 is so seated it acts as an upper check valve. The other or upper end of the aperture 48 is enlarged and threaded to receive therein a removable bushing 49. The removable bushing is also provided with a central aperture 50 for venting pressure exerting fluid to the atmosphere from the aperture 48 into and through the chamber 20 and the vent opening 19. This bushing is made removable so that the size of the opening 50 may be changed as desired to vary the capacity of fluid flow from the port 48 into the cylinder 20. A nipple 51 extends downwardly from the piston 45 and is threaded for the purpose of holding a leather seal 52 in place by a gland 53. The leather seal 52 permits movement of the piston 45 without leakage of fluid thereby.

A compression coil spring 54 is interposed between the top of the upper end 28 of the cross-coupling 26 and the gland 53.

The operation of the valve mechanism described above will now be explained. A downward pressure is exerted at the top of the plunger 18 to set the valve at any predetermined pressure desired at the outlet. Means for exerting pressure on the plunger, illustrated by an arrow, may be effected by any one of numerous leverage arrangements (not shown). It is necessary that this pressure be such as to maintain the plunger 18 in any desired position shown by the pressure indicator thereon. The pressure indicator, as shown in Figure 1, consists of markings on the plunger 18 and the pressure desired is indicated by registration of the desired mark with the top edge of the outer projecting portion 16 of the upper end cap 12. As shown in Figure 1, the indicator is set at zero in which position no pressure has been exerted downwardly on the plunger 18. It should be understood, however, that this pressure indicator may be arranged in connection with the leverage mechanism for operating the plunger 18 or, in fact, by any means suitably indicating the compression exerted by the coil spring 46.

When set at the pressure desired, the plunger flange 23 compresses the coil spring 46, moving the piston 45 downwardly against compression of the coil spring 54. By so doing, the nipple 51 seats against the upper spherical ball 42, thereby cutting off any fluid flow into the cylinder 20 and into the atmosphere through the vent opening 19. Pressure on the ball 42 moves the hexagonal valve member 40 downwardly against the lower spherical ball 37, unseating the latter and allowing fluid to flow from the inlet 35 through the inlet chamber 31 and upwardly through the openings between the valve member 40 and the circular coupling opening 38. The fluid then flows into the outlet chamber 55, formed between the cross-coupling 26 and the leather seal 52, to exert a pressure against the latter.

When the pressure against the leather seal 52 reaches the pre-set pressure, as indicated on the pressure indicator, the downward pressure as exerted through the coil spring 46 by the plunger 18 is overcome, thereby relieving the pressure on the lower check valve 37. As soon as the pressure on the valve is removed, the spiral coil spring 36 urges the ball 37 into the seat provided by the opening 38, thereby cutting off further fluid flow into the chamber 55.

The pressure exerted by fluid trapped in the chamber 55 serves to hold the upper spherical ball or check valve 42 against the seat provided by the aperture 48, thereby cutting off fluid flow into the chamber 20. The only available opening through which the fluid may then flow is through the opening 32 into the outlet 34.

Should the pressure desired in the outlet drop below the pressure set on the indicator, the piston 45 immediately moves downwardly to open the lower ball 37 to again allow fluid to flow into the chamber 55 from the inlet 35. As soon as the proper pressure is built up in the outlet, the check valve or ball 37 again closes to maintain a constant outlet pressure. It will be noted from the foregoing that the piston 45 is a pressure responsive actuator for the valve member 40.

An additional modification is illustrated in Figure 4. This modification provides a slidable valve member 56 as a substitute for the hexagonal valve member 43 illustrated in Figures 1 and 3. As shown, the valve member 56 is a rod-like member slidably received within the coupling opening 38 and is provided with a plurality of longitudinal grooves 57 through which fluid pressure can flow in the same manner as the openings provided between the side surfaces of the hexagonal valve member 43 and the central opening 38 of the coupling 26. It should be understood, however, that the cross-sectional shape of the valve member can be of any shape which provides fluid flow openings between the chambers 31 and 55. For example, longitudinal holes could be provided through the valve member, or its cross-sectional shape could be square or triangular. In fact, a valve member having any angular shape providing lateral clearances when inserted within the opening 38, would be suitable. A valve of square cross-section could, of course, be provided from square rod stock which would eliminate the added expense of machining as in the case of the hexagonal valve member 40.

An additional embodiment of the present invention is illustrated in Figure 5, showing a valve member 58 having a base portion 59 of hexagonal shape in cross-section which tapers upwardly and terminates at its upper end 60 in a circular cross-sectional shape.

Fingers or prongs 41, the same as provided with the valve member 40 and which are illustrated in Figures 1 and 2, are provided at the upper end 60 of the valve member 58. These fingers may tightly grip the ball 42 to hold it against movement or the ball may be held loosely therebetween for limited movement in any direction. If desired, the ball may be welded to or embedded in the top 60 of the valve. The fingers, as shown, are integrally connected to the valve member 58 and may be integral projections therefrom or separate members either embedded in or welded to the top of the valve at its periphery.

Likewise, the base of the valve, shown as being hexagonal, may be square, triangular, or in fact of any shape which, when inserted within the opening 38, will provide fluid passageways therebetween.

By being shaped as shown, the valve member 58, when inserted within the opening 38, can gyrate at its upper end about its longitudinal axis to allow the ball 42 to find its proper seat with the piston opening 48. The valve member is thereby self-aligning.

It should be understood that all parts of the valve mechanism illustrated and described are preferably of brass, with the exception of the hardened steel balls 37 and 42 and the springs 36, 46 and 54. However, the valve members 40, 56 and 58 may be magnetized in order to attract the hardened steel balls thereto for retaining them in near alignment with their respective seats. When so desired, the valve members may be provided from steel stock.

Another form of valve mechanism is illustrated in Figures 6, 7 and 8. Like parts in Figures 1 and 6 bear the same reference numerals.

In this modified form of device, there is illustrated a one-piece valve body 11a having an upper end cap 12a and a lower end cap 27a. A vent opening 19a is provided through the upper end cap to vent pressure within the chamber or cylinder 20a to the atmosphere. The upper portion of the end cap 12a is exteriorly threaded as at 65 for the purpose of threadedly engaging a supporting plate 66. An operating handle device 67 is threaded to the outer extremity of the upper end cap 12a and seats against the supporting plate 66. This handle device consists of a supporting base 68 having a hexagonally-shaped ring portion 69 internally threaded to engage the threaded end of the cap 12a.

A pair of spaced upwardly extending legs 70 and 71 are integrally connected to the ring 69. A handle 72 is threaded to a cam head 73 and pivotally connected to and between the spaced legs by means of a rivet or bolt 74. The lower edge of the cam head 73 is curved for a purpose to be more fully explained hereinafter. A plunger 18a having a ring shoulder 23a adjacent its lower end is inserted through a central aperture 22a provided in the end cap 12a. A recess 75 is provided in the upper end of the plunger 18a and receives therein a ball 76 which engages against the lower curved edge of the handle cam head 73.

When the operating handle device 67 is rocked around its pivot 74, the cam engagement between its curved lower edge and the ball 76 moves the plunger 18a in an axial direction. Movement of the handle in a direction towards the right forces the plunger downwardly, and movement in the opposite direction or to the left allows the coil spring 46 to return the plunger upwardly until its shoulder 23a abuts or seats against the lower surface of the end cap 12a.

The lower end of the spring 46 seats within a piston 45a which is of the same construction as the piston illustrated in Figure 1, with the exception that the nipple portion has been removed. A flat metal plate 77 is seated against the leather seal 52, and the seal and plate are maintained against the bottom surface of the piston 45a by means of a bushing 78. This bushing has a hexagonal shaped head 79 and an exteriorly threaded shank 80 for engaging within the threaded opening provided centrally of the piston 45a. A central aperture 81 is provided in the bushing to perform the same function as the aperture 48 in the device illustrated in Figure 1.

At the lower end of the piston chamber, the one-piece body 11a is provided with an internal upwardly extending neck portion 82 terminating at its upper end in a reduced portion defining a shoulder 83. A sleeve 84 embraces the upper reduced end of the neck 82 and is provided with an outwardly extending flange 85 which abuts against the shoulder 83 and an embracing shank 86 which embraces the reduced end of the neck. The flange 85 serves to seat the lower end of the coil spring 54 in spaced relation from the outlet opening 32. The upper end of the spring is seated against the plate 77 and embraces the head 79 of the bushing 78.

A valve member 40a is slidingly seated within the axial aperture 38a. The upper end of the valve member is provided with fingers 41 which loosely hold the ball 42 for limited movement in any direction. As shown, the ball 42 seats against the edge defined by the central opening in the bushing 78. The lower end of the opening 38a provided within the body portion 11a is enlarged, as at 87, and terminates at its lower end in a threaded portion 88. A hollow bushing is provided with an exteriorly threaded shank 89 for insertion within the threaded end 88 of the enlarged opening 87 and has an outwardly extending flange 90 which seats against the end of the body 11a. The bushing is also provided with a central aperture 91 of the same diameter as the central opening 38a in the body 11a. The length of the bushing is considerably less than the length of the enlarged opening 87.

As best shown in Figure 8, the valve 40a is provided with a pin 92 whose ends extend beyond the side surfaces of the valve member and terminate short of the inside diameter of the enlarged opening 87. The space provided between the end of the opening 87 and the end of the bushing 89 limits the movement of the pin 92 in a longitudinal axial direction of the valve member 40a and thereby limits endwise movement of the valve member. It is to be noted that the pin 92 is free to rotate within the enlarged opening 87, thereby permitting the valve member 40a to rotate.

A ball 37 seats against the edge of the bushing 89 defined by the central opening 91 and is maintained in its seated position by means of the spiral coil spring 36 seated within the cap 27a. As in the previous form of the device illustrated in Figure 1, a pet cock 39 is threaded into the end of the cap 27a and arranged to be opened for draining dirt and moisture collected in the chamber 31a.

The bushings 78 and 89 are preferably formed of relatively hard metal, such as Monel metal. In each case, the bushings have been shown as being provided with central openings having substantially the same diameters along their entire length. If desired, these central apertures may be slightly tapered, particularly when it is necessary to reform their edges defining the seat for the check valve ball.

If it is desired to provide a pressure indicator similar to the indicator shown in Figure 1, markings may be provided along the cam edge of the head 73, and the engagement between the markings and the edge of a leg 70 or 71 will indicate the pressure desired.

Notwithstanding the structural differences in the valve mechanisms illustrated in Figures 1 and 6, the modified device illustrated in the latter figure is the same as described in the former. In the latter modification, it will be noted that removable seats have been provided for the check valve ball members.

From the foregoing, it is apparent that I have provided a valve mechanism which is capable of fine adjustments as to outlet pressures desired and which is capable of maintaining any desired constant differential relationship between its inlet and outlet.

While particular embodiments of this invention have been illustrated, it will be understood that the invention should not be limited thereto, since many modifications may be made and, therefore, it is contemplated by the appended claim to cover all such modifications as fall within the true spirit and scope of the invention.

I claim as my invention:

A valve for delivering fluid at a selected constant pressure comprising a housing having an intermediate wall defining an inlet chamber and an outlet chamber, said wall having an opening therethrough for placing said chambers in fluid communication, one end of said opening being enlarged and internally threaded, a hollow bushing threaded partially into said enlarged portion of the opening and having its mouth formed as a valve seat, a valve actuator slidable in said wall opening and cooperating therewith to provide a fluid flow passage between the chambers, stop means carried by said valve actuator and extending into the enlarged portion of said wall opening between the end of the enlarged portion and the bushing partially threaded therein to limit sliding movement of said actuator, a spring biased ball in the inlet chamber normally urged against the valve seat on said bushing adjacent one end of said actuator, a ball in the outlet chamber carried by the other end of said actuator, and means including a valve seat cooperating with said ball in the outlet chamber for exerting a predetermined pressure through said actuator against the ball in said inlet chamber for placing said chambers in fluid communication, said ball in the inlet chamber closing said fluid communication between the chambers when fluid pressure in the outlet chamber balances the predetermined pressure exerted by said means.

FRED G. MANLY.